United States Patent [19]

Hamilton et al.

[11] Patent Number: 5,412,585
[45] Date of Patent: May 2, 1995

[54] ULTRASONIC CONTROL DISK DRIVE SYSTEM

[76] Inventors: Scott L. Hamilton, 3069 Mill Run Ct., Duluth, Ga. 30136; David J. Naddor, 10540 Branham Fields Rd., Duluth, Ga. 30136

[21] Appl. No.: 140,836

[22] Filed: Oct. 25, 1993

[51] Int. Cl.6 .............. G04F 1/00; G04F 3/00
[52] U.S. Cl. ................... 364/569; 395/750; 395/700; 364/707
[58] Field of Search ........... 364/569, 707, 483; 340/825; 395/750, 700

[56] References Cited

U.S. PATENT DOCUMENTS

| | | | |
|---|---|---|---|
| 4,540,984 | 9/1985 | Waldman | 340/825 |
| 4,907,183 | 3/1990 | Tanaka | 364/707 |
| 4,980,836 | 12/1990 | Carter et al. | 364/483 |
| 5,239,652 | 8/1993 | Seibert et al. | 395/750 |
| 5,339,445 | 8/1994 | Gasztonyi | 395/750 |
| 5,355,501 | 10/1994 | Gross et al. | 395/750 |

FOREIGN PATENT DOCUMENTS 3166282  12/1991  Japan .

Primary Examiner—Emanuel T. Voeltz
Assistant Examiner—Patrick J. Assouad
Attorney, Agent, or Firm—S. Pal Asija

[57] ABSTRACT

The invention also known as "Disk-saver" employs a novel method of controlling the power to the hard disk drive of an electronic digital computer. A "Terminate and Stay Resident" (TSR) program is executed in the electronic digital computer which provides the timing function to determine when the hard disk drive should be turned off. When the decision is reached to turn the power on or off, the TSR program generates an ultrasonic coded signal which is sent to a loudspeaker to which the disk-saver module of this invention is connected to monitor the ultrasonic coded signal. When the signal is generated the Disk-saver module of this invention turns the power to the disk drive on or off as directed by the coded ultrasonic signal.

18 Claims, 2 Drawing Sheets

ULTRASONIC CONTROL DISK DRIVE SYSTEM

SUMMARY

This invention relates to an improvement in Disk drive systems. More particularly it relates to turning a disk drive off via an ultrasonic signal when not in use beyond a threshold of time.

The invention also known as "Disk-saver" employs a novel method of controlling the power to the hard disk drive of an electronic digital computer. A "Terminate and Stay Resident" (TSR) program is executed in the electronic digital computer which provides the timing function to determine when the hard disk drive should be turned off. When the decision is reached to turn the power on or off, the TSR program generates an ultrasonic coded signal which is sent to a loudspeaker to which the disk-saver module of this invention is connected to monitor the ultrasonic coded signal. When the signal is generated the Disk-saver module of this invention turns the power to the disk drive on or off as directed by the coded ultrasonic signal.

This permits installation of the disk-saver in the computer without the use of a dedicated card slot. The power is turned off when disk access is not required. This in turn results in increasing the longevity of the internal electrical and mechanical components of the hard disk drive.

As a result overall power consumption and internal heat generation inside the computer is reduced. Finally the ambient noise level is reduced by deactivating the hard disk drive motor when it is not in use. This increases the life and reliability of both the computer and disk drive.

The result is that the computer may be left on continuously which provides the convenience of avoiding turning on the computer and waiting for it to complete the power up sequence each time the computer is to be used.

PRIOR ART

A preliminary prior art search was conducted and furthermore the inventors are intimately familiar with the problem and the prior art.

Prior art battery powered portable computers disengage the internal hard disk drive for the sole purpose of conserving battery life, where as this invention is unique in that it is intended for use in computers other than those that are battery powered.

Other prior art schemes and devices for controlling and conserving the power to the computer and the disk drive and other peripherals are integrated into the computer and are not suitable for use with existing computers without the use of an internal card slot availability and require sophisticated interface connections which most personal computer users are not able to do without the help of a computer consulting expert.

Some other prior art system shut off power supply selectively when a low battery power is detected, while other prior art systems put the entire computer and all its peripherals in the stand-by mode when not used for a predetermined time, rather than putting a particular peripheral in the stand-by mode so that uninterrupted computer use can continue even though a particular peripheral such as a disk drive is not being used.

These prior art systems sense lack of computer activity by monitoring the data/address bus which is very difficult if not impossible to implement on existing systems for the personal computer user of average skill in the art and hence the need for this invention.

Following are typical examples of the prior art know to and uncovered by the inventor which is arranged below in the reverse chronological order for the convenience of the reader.

a) U.S. Pat. No. 4,980,836 granted to Carter et al on Dec. 25, 1990 for "Apparatus for Reducing Computer System Power Supply"

b) U.S. Pat. No. 4,907,183 granted to Tanaka of Japan on Mar. 6, 1990 for "Battery Powered Computer System Wherein a Power Supply is Selectively Shut Off When a Low Battery Power is Detected."

Unfortunately none of the prior art devices singly or even in combination meet all of the objectives established by the inventor for the Ultrasonic Control Disk Drive System of this invention.

OBJECTIVES

1. It is an objective of this invention to provide a means for turning off a hard disk drive when not in use for a predetermined time which can be easily implemented on the existing systems by a novice computer user.

2. Another objective of this invention is to provide a means for easily integrating this invention into new computer systems.

3. Another objective of this invention is to turn off a computer peripheral by sending an ultrasonic coded digital signal generated by a "Terminate & Stay Resident" (TSR program in the computer.

4. Another objective of this invention is to specifically power down a hard disk drive (HDD) used in an existing personal computer system when the disk access is not required.

5. Another objective of this invention is that it be suitable for all types of computer systems including but not limited to main-frame, Mini, Micro, personal, desk-top, luggable, portable, lap-top and palm-top computers.

6. Another objective of this invention is that it be easy to use and require no special skill on the part of the user.

7. Another objective of this invention is that the Disk-saver module of this invention be compact, light weight and low cost.

8. Another objective of this invention is that the disk-saver of this invention increase the longevity of the internal electrical and mechanical components of the hard disk drive, CD-ROM drive, floppy drive and the like peripherals.

9. Another objective of this invention is that the DISK-SAVER system of this invention be modular comprising several sub-systems easily interface-able to each other.

10. Another objective of this invention is that it be safe and reliable.

11. Another objective of this invention is that it entail less noise and less vibration.

12. Another objective of this invention is that it be environmentally safe.

13. Another objective of this invention is that it be physically safe, environmentally safe, noise free and consume little or no energy.

14. Another objective of this invention is that it consume less energy than comparable systems.

15. Another objective of this invention is that it be easy to use and maintain.

16. Another objective of this invention is that it meet all federal, state, local and other private standards guidelines, regulations and recommendations with respect to safety, environment, and energy consumption.

17. Another objective of this invention is that it reduce the overall power consumption and internal heat generation inside the entire computer system.

18. Another objective of this invention is that it be ergonomically designed to avoid any ill side effects on the health of the user.

19. Another specific objective of this invention is to reduce the ambient noise by deactivating hard disk drive motor when not in use.

20. Another objective of this invention is that the disk saver of this invention can be connected to the speaker without regard to the signal polarity of the speaker.

Other objectives of this invention reside in its simplicity, elegance of design, ease of manufacture, service and use and even aesthetics as will become apparent from the following brief description of the drawings and the detailed description of the preferred embodiment.

In summary the main objective of this invention is to permit the user to leave his/her computer system on continuously all the time so as to obviate turning the computer on and waiting for the power up sequence each time the computer is to be used. This is particularly important for a frequent but intermittent user.

BRIEF DESCRIPTION OF THE DRAWING

The objects, features and advantages of the present invention and its application will be more readily appreciated when read in conjunction with the accompanying drawing, in which.

DETAILED DESCRIPTION OF THE PREFERRED EMBODIMENT

Figure 1:
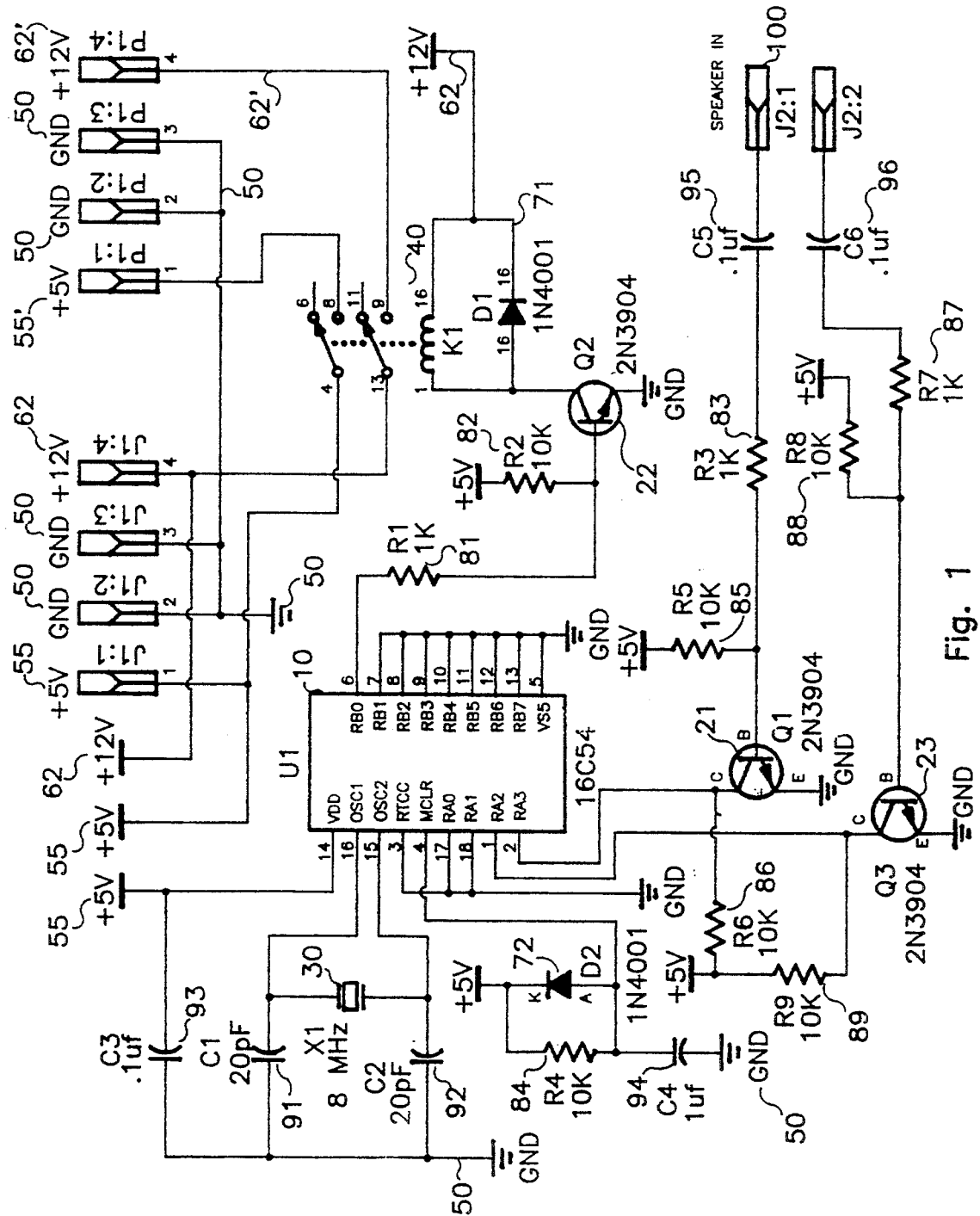
FIG. 1 is a circuit diagram of the Ultrasonic control disk drive system of this invention including ultrasonic interface to disk drive via loud speaker b)

The FIG. 1 shows an enabling circuit used by the inventor in the preferred embodiment. The heart of that circuit is the integrated circuit 10 (U1 such as 16C54) which has +5 volt power supply 55 and 8 MHz crystal 30 and transistors 21 and 23 (such as 2N3904) and diode 72 such as 1N4001 connected to it on the input side and on the output side it has transistor 22, relay 40 diode 71. The speaker connections 100 come from the bases of the transistors 21 and 23 via suitable resistors and capacitors values of which are easily calculate-able by circuit designers of average skill in the art.

For the ease of the user and to avoid undue experimentation the inventors has listed the component values of all components used in the preferred embodiment including Resistors R1-R9 and capacitor C1 through C6.

As shown in the circuit of FIG. 1 the transistor 23 in combination with resistors 87, 88 and 89 acts as buffer to obviate observing the polarity of the speaker connection 100. With this feature the user can connect the speaker without regard to which side of the speaker is connected to the power supply and which side to the signal.

This new feature presents signal as well as the power connection of the speaker to the microprocessor 10. The microprocessor 10 on power up monitors I/O pins for polarity and determines which one is signal connection.

The power supply 55' and 62' to the hard disk drive is routed through the disk saver of this invention. Relay 40 turns the power to the hard disk drive on or off as commanded by the microprocessor 10. The speaker is connected via the connector 100.

The microprocessor 10 also monitors the speaker signal through the buffers comprised of buffer 1 (capacitor 95, resistor 83, 85, 86 & transistor 21) and buffer 2 (capacitor 96, resistors 87, 88, 89 & transistor 23). Thus each side of the speaker connection 100 is buffered to eliminate the need for connecting to the speaker in a particular polarity.

These buffers (Buffer-1 & Buffer-2) also convert the speaker signal to a TTL level. Resistor 84, capacitor 94 and diode 72 provide a power on reset signal to the microprocessor 10. Resistors 81, 82 and transistor 22 allow the microprocessor 10 to control the relay 40, which is operated by 12 volt direct current supply 62.

Diode 71 prevents the reverse emf (electro-magnetic force) generated by the relay 40 from damaging transistor 22. The clock for the microprocessor 10 is provided by the crystal 30 and capacitors 91 and 92. Capacitor 93 is used as decoupling capacitor.

Figure 2:
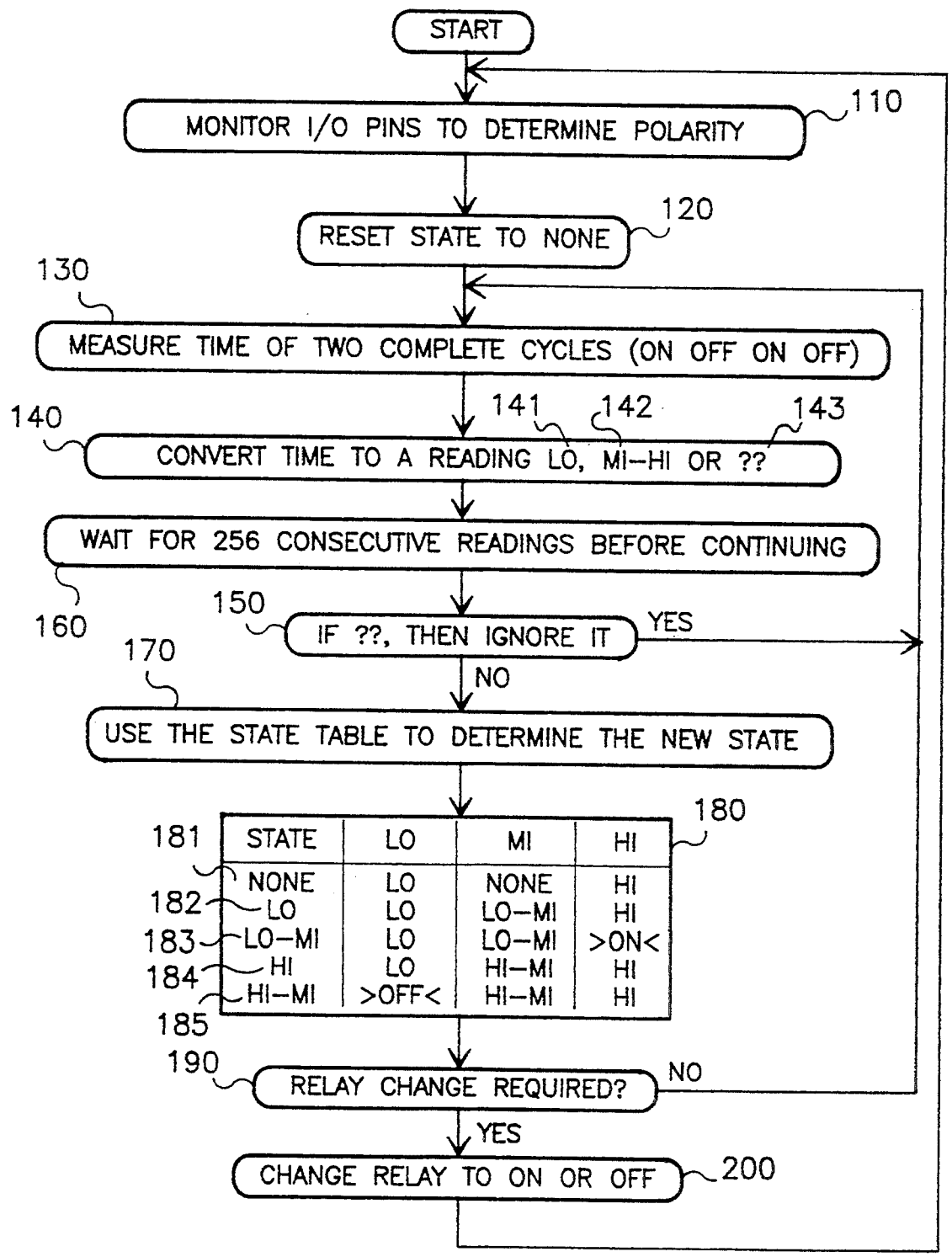
FIG. 2 is a view of the flow chart of the disk saver TSR program including a listing of the various operating states.

As shown in FIG. 2, the process in the computer system having at least one microprocessor, one input device, one output device, one speaker and an ultrasonic control hard disk drive as its peripherals each connected to said microprocessor as well as means for turning power to said disk drive off via a relay connected in series in the power supply to said disk drive comprises the steps of:

a) determining polarity of said speaker;
b) resetting state to none;
c) measuring time of two complete cycles consisting of on off on off;
d) converting time to a reading LO, MI, HI or indeterminate also known as (??);
e) waiting for 256 consecutive readings;
f) determining new state by using a state table;
g) determining if power relay change is required; and
h) changing said relay if power change is required.

The state table comprises the following states:

```
STATE = LOW + Medium + High
a) NONE = Low + None + High;
b) LOW = Low + Low to Medium + High;
c) Transition
LOW to MEDIUM = Low + Low to Medium + ON;
d) HIGH = Low + High to Medium + High;
e) Transition
HIGH to MEDIUM = OFF + High to Medium + High.
```

Furthermore the disk on coded signal is sent as Low to Medium to High repeated three times and disk off coded signal is sent as High to medium to low repeated 3 times.

OPERATION

The operation of the program is as follows:
1. Main Program
   a) Get user settings for spin up and spin down time of the hard disk drive.
   b) Link disk and timer interrupts
   c) Establish a timer variable and reset it to 0
   d) Terminate as a TSR program in the CPU
2. On Disk Interrupt a) Set the disk request flag
b) Wait for the disk ready flag
c) If user had to wait, then reset the disk
3. On timer interrupt in state 0 when disk is up and running.
   a) If disk request flag is set, then reset timer to 0
   b) Increment timer
   c) If timer reaches spin down time, change to state 1 and reset timer to 0.
4. On timer interrupt in state 1 when disk is coming down
   a) Turn off disk ready flag
   b) Generate tone according to timer
   c) Increment timer
   d) If the last tone has been sent, change to state 2 and reset timer to Zero (0)
   e) Return to caller
5. On timer interrupt in state 2 when disk is already down
   a) Determine status of disk request flag
   b) If disk request flag is set, change to state 3 and reset timer to 0.
   c) If disk request flag is not set do nothing.
6. On timer interrupt in state 3 when disk is coming up
   a) Generate tone according to timer
   b) Increment timer
   c) If the last tone has been sent change to state 0, reset timer and set disk ready flag.

The tones for turning the disk on and off via the ultrasonic speakers last for 1/18 seconds (one computer timer tick) in the following sequence:
   a) To turn the disk on
   LO MI HI LO MI HI LO MI HI
   b) To turn disk off
   HI MI LO HI MI LO HI MI LO
wherein
   LO=25 KHz
   MO=30 KHz
   HI=40 KHZ It should be noted that the tone sequences for turning the disk on and off are reverse of each other. The sequence for turning the disk on is in ascending frequency PC ticks and tone sequence for turning the disk off is descending frequency PC ticks.

The inventor has given a non-limiting description of the concept. Many changes may be made to this design without deviating from the spirit of the concept of this invention. Examples of such contemplated variations include the following.
   a) The logic may be modified without deviating form the spirit and essential functionality of the concept.
   b) The invention may be combined with other functions which complement each other with or without synergism.
   c) The hardware/software tradeoff may be shifted.
   d) The component values or types or tolerances may be changed without deviating from their essential functionality.
   e) The ultrasonic frequencies may be changed.
   f) Additional states may be created.
   g) The computer program may be refined.
   h) The system may be adapted for turning on and off other appliances and computer peripherals.

Other changes such as aesthetic and substitution of newer materials as they become available which substantially perform the same function in substantially the same way with substantially the same result without deviating from the spirit of this invention may be made.

DEFINITIONS

While extreme care has been taken to avoid terms of art and to use the conventional meaning of the terms as used in the trade and the dictionaries, the following definitions are added for further clarification.

A PC Timer tick or clock cycle or a computer timer unit all refer to the same thing, which is a standard clock increment used in all IBM and compatible PC's.

The phrase "OUT OF TONES" means if the last tone has been sent.

Linking in software arts and as used here means connecting

Spin up and spin down times are constant times associated with each disk drive.

Timer variable refers to the timer in the DiskSaver, which is a pre-set and pre-selected time duration exceeding said spin up and spin down times.

No-op refers to no operation ( or nothing is done) for a given number of computer clock cycles generally one Input and output devices refers to input and output devices commonly associated with a computer such as a keyboard, plotter printer etc.

Plurality of memory devices refers to memory devices commonly associated with a computer such as a random access memory, read only memory, tape drive, floppy drive, CD-ROM drive and the like devices Module refers to a stand alone smaller unit of a larger unit such as a power supply unit, a microprocessor etc.

Ultrasonic coded signal is used to mean ultrasonic electrical energy signal and not ultrasonic sound energy signal.

Following is a listing of the components used in this embodiment arranged in ascending order of the reference numerals for ready reference of the reader.
10=Integrated Circuit such as 16C54
20=Transistor generally
21=Transistor Q1 such as 2N3904
22=Transistor Q2 such as 2N3904
23=Transistor Q3 such as 2N3904
30=8 MHz Crystal Oscillator
40=Relay K1
50=Ground
55=+5 Volt Direct Current Power Supply
55'=+5 Volt to hard disk via disk saver
62=+12 Volt Direct Current Power Supply
62'=+12 volt to hard disk via disk saver
70=Diode generally
71=Diode D1 such as 1N4001
72=Diode D2 such as 1N4001
81=Resistor R1 such as 1 Kilo Ohms Carbon 10%
82=Resistor R2 such as 10 Kilo Ohms Carbon 10%
83=Resistor R3 such as 1 Kilo Ohms Carbon 10%
84=Resistor R4 such as 10 Kilo Ohms Carbon 10%
85=Resistor R5 such as 10 Kilo ohms Carbon 10%
86=Resistor R6 such as 10 Kilo ohms Carbon 10%
87=Resistor R7 such as 1 Kilo ohms Carbon 10%
88=Resistor R8 such as 10 Kilo ohms Carbon 10%
89=Resistor R9 such as 10 Kilo ohms Carbon 10%
91=Capacitor C1 such as 20 pico farad
92=Capacitor C2 such as 20 pico farad
93=Capacitor C3 such as 0.1 micro farad
94=Capacitor C4 such as 1 micro farad
95=Capacitor C5 such as 0.1 micro farad
96=Capacitor C6 such as 0.1 micro farad
100=Speaker Connections 110=Program to monitor I/O pins to determine polarity of speaker connections 100
120=Program to reset state to "NONE"
130=Program to measure time of 2 complete cycles such as "ON-OFF-ON-OFF"
140=Program to convert time to a reading LO, MI-HI, or Indeterminate (??)
141=Reading LO
142=Reading MI-HI
143=Indeterminate Reading also known as (??)
150=Decision Block to ignore indeterminate
160=256 consecutive readings wait
170=Program to determine new state using table
180=State Table
181=NONE State
182=LO state
183=LO-MI Transition State
184=HI State
185=HI-MI Transition State
190=Decision Block to determine if relay change is required.
200=Program to change relay to On or Off Appendix -1
Microprocessor Sample Source Program

```
;       ┌─────────────────────────────────────────────────────┐
;       │              D I S K S A V E R                      │
;       │  Copyright (c) 1992-1993, Development Solutions, Inc.│
;       │              All Rights Reserved                    │
;       └─────────────────────────────────────────────────────┘

DEVICE  PIC16C54, XT_OSC, WDT_ON, PROTECT_ON   ; 4 MHz
        ID      0902h                                   ; September 2, 1993
        RESET   INIT ;       ┌──────────────┐
;       │  I/O ports   │
;       └──────────────┘
DISK    =       RB.0                    ; Disk drive relay output
SPKR1   =       RA.2                    ; Speaker input 1
SPKR2   =       RA.3                    ; Speaker input 2

;       ┌──────────────┐
;       │  Registers   │
;       └──────────────┘
STATE   =       08h                     ; One of the above states
TYPE    =       09h                     ; 0, 1, 2, or 3
LAST    =       0Ah                     ; Previous type
COUNT   =       0Bh                     ; Number of consecutive types
FREQ    =       0Ch                     ; RTCC count at one duty cycle
TEMP    =       0Dh                     ; Temporary register
TRY     =       0Eh                     ; Repeat counter ;       ┌──────────────┐
;       │ State values │
;       └──────────────┘
GOT0    =       0 * 4                   ; Don't know yet
GOT1    =       1 * 4                   ; Got 1
GOT3    =       2 * 4                   ; Got 3
GOT12   =       3 * 4                   ; Got 1, then got 2
GOT32   =       4 * 4                   ; Got 3, then got 2
GOT123  =       1 + 80h                 ; Got 1, 2, and then got 3
GOT321  =       0 + 80h                 ; Got 3, 2, and then got 1

;       ┌──────────────┐
;       │  Initialize  │
;       └──────────────┘
INIT    MOV     OPTION,#00001000b       ; Use internal clock; no scaling
        MOV     !RA,#11111111b          ; Use Port A for inputs
        MOV     !RB,#00000000b          ; Use Port B for outputs
        SETB    DISK                    ; Turn on disk relay ;       ┌────────────────────────┐
;       │ Reset to state GOT0    │
;       └────────────────────────┘
RESET   MOV     STATE,#GOT0             ; Reset state
        CLR     LAST                    ; Reset last type
        CLR     COUNT                   ; Reset counter ;       ┌──────────────────────────────────────────────────┐
;       │ Reset before figuring out which pin is active    │
;       └──────────────────────────────────────────────────┘
TIMEIT  CLR     TYPE                    ; Assume TYPE 0 (bad type)
        CLR     TRY                     ; Reset for maximum of 256 tries
        CLR     WDT                     ; Keep watchdog happy
        CLR     TEMP                    ; Reset temporary register
```

```
              MOVB    TEMP.7,SPKR1            ; Read speaker input pin 1
              MOVB    TEMP.6,SPKR2            ; Read speaker input pin 2
;
;       ┌─────────────────────────────────────────────────┐
;       │ Try 256 times to see who changes 16 times first │
;       └─────────────────────────────────────────────────┘
FIGURE  CLRB    TEMP.0                  ; Clear bit 0
        ADDB    TEMP,TEMP.7             ; Get previous reading of pin 1
        ADDB    TEMP,SPKR1              ; See if different now
        JB      TEMP.0,TIME1            ; If so, go time cycles on pin 1
        CLRB    TEMP.0                  ; Clear bit 0
        ADDB    TEMP,TEMP.6             ; Get previous reading of pin 2
        ADDB    TEMP,SPKR2              ; See if different now
        JB      TEMP.0,TIME2            ; If so, go time cycles on pin 2
        DJNZ    TRY,FIGURE              ; Keep waiting for somebody to change
        JMP     GOTTYP                  ; Give up ;
;       ┌──────────────────────────────────────┐
;       │ Time length of next cycle on pin 1   │
;       └──────────────────────────────────────┘
TIME1   CLR     RTCC                    ; Clear timer
:LOW1   JB      RTCC.6,GOTTYP           ; Check for overflow
        JNB     SPKR1,:LOW1             ; Wait for line to go high
:HIGH1  JB      RTCC.6,GOTTYP           ; Check for overflow
        JB      SPKR1,:HIGH1            ; Wait for line to go low
        CLR     RTCC                    ; Start timing
:LOW2   JB      RTCC.6,GOTTYP           ; Check for overflow
        JNB     SPKR1,:LOW2             ; Wait for line to go high
:HIGH2  JB      RTCC.6,GOTTYP           ; Check for overflow
        JB      SPKR1,:HIGH2            ; Wait for line to go low
        MOV     FREQ,RTCC               ; Read RTCC
        JMP     TOTYPE                  ; Go convert to TYPE ;
;       ┌──────────────────────────────────────┐
;       │ Time length of next cycle on pin 2   │
;       └──────────────────────────────────────┘
TIME2   CLR     RTCC                    ; Clear timer
:LOW1   JB      RTCC.6,GOTTYP           ; Check for overflow
        JNB     SPKR2,:LOW1             ; Wait for line to go high
:HIGH1  JB      RTCC.6,GOTTYP           ; Check for overflow
        JB      SPKR2,:HIGH1            ; Wait for line to go low
        CLR     RTCC                    ; Start timing
:LOW2   JB      RTCC.6,GOTTYP           ; Check for overflow
        JNB     SPKR2,:LOW2             ; Wait for line to go high
:HIGH2  JB      RTCC.6,GOTTYP           ; Check for overflow
        JB      SPKR2,:HIGH2            ; Wait for line to go low
        MOV     FREQ,RTCC               ; Read RTCC
        JMP     TOTYPE                  ; Go convert to TYPE ;
;       ┌────────────────────────────────────────────────────┐
;       │ Convert FREQ to TYPE: 1 = lo, 2 = mi, 3 = hi, 0 = others │
;       └────────────────────────────────────────────────────┘
TOTYPE  CALL    COMPUT                  ; Convert from FREQ to TYPE
        MOV     TYPE,W                  ; Save TYPE ;
;       ┌─────────────────────────────────────────────┐
;       │ See if TYPE is the same as last one (LAST)  │
;       └─────────────────────────────────────────────┘
GOTTYP  CJE     TYPE,LAST,DITTO         ; If same as before, go bump counter
        MOV     LAST,TYPE               ; Remember this type
        CLR     COUNT                   ; Reset counter
        JMP     TIMEIT                  ; Wait for next pulse ;
;       ┌─────────────────────────────────────────────────────┐
;       │ Wait for 256 of the same type, then go update state │
;       └─────────────────────────────────────────────────────┘
DITTO   IJNZ    COUNT,TIMEIT            ; Wait for count to overflow
        CALL    UPDATE                  ; Figure out new state
        MOV     STATE,W                 ; Save for later
        JNB     STATE.7,TIMEIT          ; If high bit not set, continue
        MOVB    DISK,STATE.0            ; Turn disk on or off
        JMP     RESET                   ; Go reset state
```

```
;
;       ┌─────────────────────────┐
;       │ Convert FREQ to TYPE    │
;       └─────────────────────────┘
COMPUT  MOV     W,FREQ                  ; Get RTCC counter read
        AND     W,#00001111b            ; Strip (easier than a divide by 5)
        JMP     PC+W                    ; Look up in the following table
;
        RETW    1                       ;  00   (16)   32    48
        RETW    0                       ; (01)   17    33    49
        RETW    0                       ;  02    18    34    50
        RETW    3                       ;  03    19    35   (51)
        RETW    2                       ;  04    20   (36)   52
        RETW    0                       ;  05   (21)   37    53
        RETW    0                       ; (06)   22    38    54
        RETW    0                       ;  07    23    39    55
        RETW    3                       ;  08    24    40   (56)
        RETW    0                       ;  09    25   (41)   57
        RETW    0                       ;  10   (26)   42    58
        RETW    1                       ; (11)   27    43    59
        RETW    0                       ;  12    28    44    60
        RETW    0                       ;  13    29    45   (61)
        RETW    0                       ;  14    30   (46)   62
        RETW    2                       ;  15   (31)   47    63

;
;       ┌──────────────────────────────────────────────────────┐
;       │ Figure out new STATE from previous STATE and TYPE    │
;       └──────────────────────────────────────────────────────┘
UPDATE  MOV     W,STATE                 ; Get state
        ADD     W,TYPE                  ; Add type
        JMP     PC+W                    ; Look up in state table
;
;       ┌───────────────────────────────┐
;       │ To:    0      1      2     3  │
;       └───────────────────────────────┘
FROM0   RETW    GOT0,  GOT1,  GOT0,  GOT3
FROM1   RETW    GOT0,  GOT1,  GOT12, GOT3
FROM3   RETW    GOT0,  GOT1,  GOT32, GOT3
FROM12  RETW    GOT0,  GOT1,  GOT12, GOT123
FROM32  RETW    GOT0,  GOT321,GOT32, GOT3
```

Appendix -2

```
        PAGE    80,132          TSR Sample Source Program
```

```
;
;
;
;                               ┌───────────┐
;                               │ DISKSAVER │
;                               └───────────┘
;
;         Copyright (c) 1992-1994, Development Solutions, Inc.
;                           All rights reserved
;
;                         Development Solutions, Inc.
;                            3069 Mill Run Court
;                             Duluth, GA  30136
;
;                              March 27, 1994

CODE    SEGMENT

ORG     0100h
        ASSUME  CS:CODE, DS:NOTHING, ES:NOTHING

FREQ1   EQU     19                      ; PIC timer is either 11 or 16
FREQ2   EQU     43                      ; PIC timer is either 31 or 36
FREQ3   EQU     68                      ; PIC timer is either 51 or 56

TONE1   EQU     2711                    ; 1.193181 MHz / 440 Hz   A
TONE2   EQU     2415                    ; 1.193181 MHz / 494 Hz   B
TONE3   EQU     2154                    ; 1.193181 MHz / 554 Hz   C#
TONE4   EQU     1808                    ; 1.193181 MHz / 660 Hz   E
TONE5   EQU     1356                    ; 1.193181 MHz / 880 Hz   A

SPKPIO  EQU     061h                    ; Speaker enable port
SPKDAT  EQU     042h                    ; Speaker frequency data port
```

```
SPKCTL    EQU     043h                            ; Speaker control port
TCKSEG    EQU     0040h                           ; Segment of tick counter
TCKOFF    EQU     006Ch                           ; Offset of tick counter DISKUP    EQU     0                               ; State 0: Disk is up and running
UPTODN    EQU     1                               ; State 1: Disk is going down
DISKDN    EQU     2                               ; State 2: Disk is down
DNTOUP    EQU     3                               ; State 3: Disk is coming up
TESTIT    EQU     4                               ; State 4: Disk is ready for testing
READY     EQU     5                               ; State 5: Disk is ready MAXVAL    EQU     60                              ; Maximum value for timeout
PARKTM    EQU     18                              ; Park heads 1 second before power down
MINPID    EQU     0D0h                            ; Minimum program ID to try
MAXPID    EQU     0DFh                            ; Maximum program ID to try CR        EQU     13                              ; Carriage Return
LF        EQU     10                              ; Line Feed
EOF       EQU     26                              ; End of file START:    JMP     INSTAL                          ; Go jump to installation routine DB      8,8,8                           ; Hide jump if TYPEd
WELCOM    DB      'DiskSaver Software Version 03/27/94',CR,LF
          DB      'Copyright (c) 1992-1994, Development Solutions, Inc.',CR,LF
          DB      'All rights reserved',CR,LF,LF,'$'
ENDWEL    DB      8,' ',EOF
STATE     DB      0                               ; State: 0, 1, 2, or 3
DSKREQ    DB      0                               ; Disk request is pending
TIMER     DW      0                               ; Ticks in this state
TIMOUT    DW      32760                           ; Default to 30 minutes (18.2*60*30)
NTONES    DW      14                              ; Default to ON (not quiet)
VIDSEG    DW      0                               ; Video segment (0B000h, 0B800h, or 0)
PID       DB      0                               ; Program ID
PIDAV     DB      0                               ; Program ID which might be used
LSTTCK    DB      0                               ; Low byte of last value of tick count UPFREQ    DW      FREQ1,FREQ2,FREQ3,FREQ1,FREQ2,FREQ3,FREQ1,FREQ2,FREQ3
          DW      TONE1,TONE2,TONE3,TONE4,TONE5
DNFREQ    DW      FREQ3,FREQ2,FREQ1,FREQ3,FREQ2,FREQ1,FREQ3,FREQ2,FREQ1
          DW      TONE5,TONE4,TONE3,TONE2,TONE1

SCNBUF    DB      80 * 2 DUP (0)
SCNMSG    DB      ' DiskSaver: Waiting for disk to come up to speed ... '
          DB      (80 - ($ - SCNMSG)) DUP (' ')

;
;         +----------------------------------------------------+
;         | Generate tone in CX or turn off speaker if CX = 0  |
;         +----------------------------------------------------+
;
SOUND:    CMP     CX,0                            ; Turn sound off (CX=0)?
          JE      SOUND0                          ;   yes, go do it ;
;         +---------------+
;         | Generate tone |
;         +---------------+
;
          MOV     DX,SPKPIO                       ; Get keyboard controller port
          IN      AL,DX                           ; Read port
          OR      AL,03h                          ; Turn on tone generator
          OUT     DX,AL                           ; Tell the port
          MOV     DX,SPKCTL                       ; Get speaker controller port
          MOV     AL,0B6h                         ; Reset
          OUT     DX,AL                           ; Tell port
          MOV     DX,SPKDAT                       ; Get speaker data port
          MOV     AL,CL                           ; Get low byte of value to send
          OUT     DX,AL                           ; Send it
          MOV     AL,CH                           ; Get high byte of value to send
          OUT     DX,AL                           ; Send it
          RET                                     ; Done ;
;         +-------------------+
;         | Turn off speaker  |
;         +-------------------+
;
SOUND0:   MOV     DX,SPKPIO                       ; Get keyboard controller port
```

```
            IN      AL,DX                       ; Read port
            AND     AL,0FCh                     ; Turn off tone generator
            OUT     DX,AL                       ; Tell port
            RET                                 ; Done
;
;           | Park disk |
;
PARK:       PUSH    AX                          ; Save AX
            PUSH    CX                          ; Save CX
            PUSH    DX                          ; Save DX
            MOV     AH,08h                      ; Get disk parameters
            MOV     DL,80h                      ; Use fixed disk 1
            PUSHF                               ; Pretend to be an interrupt
            PUSH    CS                          ; Pretend to be an interrupt
            CALL    INT13J                      ; Do it
            MOV     AH,0Ch                      ; Seek to last cylinder
            PUSHF                               ; Pretend to be an interrupt
            PUSH    CS                          ; Pretend to be an interrupt
            CALL    INT13J                      ; Do it
            POP     DX                          ; Restore DX
            POP     CX                          ; Restore CX
            POP     AX                          ; Restore AX
            RET                                 ; Return ;
;           | Test for disk ready |
;
CHKDSK:     PUSH    AX                          ; Save AX
            PUSH    DX                          ; Save DX
            MOV     AH,10h                      ; Test for hard disk ready
            MOV     DL,80h                      ; Use fixed disk 1
            PUSHF                               ; Pretend to be an interrupt
            PUSH    CS                          ; Pretend to be an interrupt
            CALL    INT13J                      ; Do it
            POP     DX                          ; Restore DX
            POP     AX                          ; Restore AX
            RET                                 ; Return ;
);          | Reset disk |
;
RESET:      PUSH    AX                          ; Save AX
            PUSH    DX                          ; Save DX
            MOV     AH,00h                      ; Reset hard disk
            MOV     DL,80h                      ; Use fixed disk 1
            PUSHF                               ; Pretend to be an interrupt
            PUSH    CS                          ; Pretend to be an interrupt
            CALL    INT13J                      ; Do it
            POP     DX                          ; Restore DX
            POP     AX                          ; Restore AX
            RET                                 ; Return ;
;           | Display a message on bottom line |
;
UPMSG:      MOV     AH,0Fh                      ; Get current video mode
            INT     10h                         ; Do it
            CMP     AL,7                        ; Graphics mode?
            JA      UPMSGX                      ;  yes, forget it
            MOV     [VIDSEG],0B800h             ; Assume non-monochrome
            JB      UPMSG2                      ; Continue if assumption correct
            MOV     [VIDSEG],0B000h             ; Use monochrome ;
;           | Save current bottom line |
;
UPMSG2:     MOV     AX,CS                       ; Get CS
            MOV     ES,AX                       ; Copy to ES
            MOV     AX,[VIDSEG]                 ; Get video base
            MOV     DS,AX                       ; Copy to DS
            MOV     SI,24 * 80 * 2              ; Point to bottom line
            LEA     DI,SCNBUF                   ; Point to save buffer
            MOV     CX,80                       ; Copy 80 words
```

```
        CLD                             ; Just to be safe
        REP     MOVSW                   ; Save bottom line in buffer
;
;       |Display a new bottom line|
;
        LEA     SI,SCNMSG               ; Point to message for bottom line
        MOV     DI,24 * 80 * 2          ; Point to bottom line
        MOV     CX,80                   ; Copy 80 characters
BOTLIN: MOV     AL,ES:[SI]              ; Get next character
        MOV     DS:[DI],AL              ; Copy that character to bottom line
        INC     SI                      ; Advance input pointer
        INC     DI                      ; Advance output pointer
        MOV     AL,70h                  ; Use reverse video
        MOV     DS:[DI],AL              ; Copy the attribute
        INC     DI                      ; Advance output pointer
        LOOP    BOTLIN                  ; Continue for the entire line ;
;       |Clean up|
;
        MOV     AX,CS                   ; Get CS
        MOV     DS,AX                   ; Restore DS (which was same as CS)
UPMSGX: RET                             ; Return ;
;       |Undo message on bottom line|
;
UNDOMS: CMP     [VIDSEG],0              ; Message pending?
        JE      UNDOX                   ;   no, get out of here
        MOV     AX,[VIDSEG]             ; Get video base
        MOV     ES,AX                   ; Copy to ES
        LEA     SI,SCNBUF               ; Point to save buffer
        MOV     DI,24 * 80 * 2          ; Point to bottom line
        MOV     CX,80                   ; Copy 80 words
        CLD                             ; Just to be safe
        REP     MOVSW                   ; Restore bottom line
        MOV     [VIDSEG],0              ; Clear video base (no more message)
UNDOX:  RET                             ; Return TCKTAB  DW      TICK0                   ; State = 0: DISKUP
        DW      TICK1                   ; State = 1: UPTODN
        DW      TICK2                   ; State = 2: DISKDN
        DW      TICK3                   ; State = 3: DNTOUP
        DW      TICK4                   ; State = 4: TESTIT
        DW      TICK5                   ; State = 5: READY
        DW      TICK6                   ; State = 6: not used
        DW      TICK7                   ; State = 7: not used ;
;       |Handle timer tick|
;
TICK:   PUSH    AX                      ; Save AX
        PUSH    BX                      ; Save BX
        PUSH    CX                      ; Save CX
        PUSH    DX                      ; Save DX
        PUSH    SI                      ; Save SI
        PUSH    DI                      ; Save DI
        PUSH    DS                      ; Save DS
        PUSH    ES                      ; Save ES
;
;       |Check to see if we're disabled|
;
        CMP     CS:[TIMOUT],0           ; Disabled?
        JE      GETOUT                  ;   yes, do nothing!

;
;       |Make sure this is a new tick|
;
        PUSH    ES                      ; Save ES
        MOV     AX,TCKSEG               ; Point to tick count segment
        MOV     ES,AX                   ; Do it
        MOV     AL,ES:[TCKOFF]          ; Get current tick count in AL
```

```
            POP     ES                      ; Restore ES
            CMP     AL,CS:[LSTTCK]          ; Compare with current tick count
            JE      GETOUT                  ; If same, INT 08 was called by mistake
            MOV     CS:[LSTTCK],AL          ; Remember new tick count
;
;           +---------------------+
;           | Look at our state   |
;           +---------------------+
            MOV     AX,CS                   ; Get CS
            MOV     DS,AX                   ; Copy to DS for convenience
            MOV     BL,[STATE]              ; Get state
            AND     BL,07h                  ; Just to be safe
            MOV     BH,0                    ; Clear high byte
            ADD     BX,BX                   ; Multiply by two
            CALL    TCKTAB[BX]              ; Jump to appropriate routine
;
;           +----------+
;           | Clean up |
;           +----------+
GETOUT:     POP     ES                      ; Restore ES
            POP     DS                      ; Restore DS
            POP     DI                      ; Restore DI
            POP     SI                      ; Restore SI
            POP     DX                      ; Restore DX
            POP     CX                      ; Restore CX
            POP     BX                      ; Restore BX
            POP     AX                      ; Restore AX
            RET                             ; Return
;
;           +-------------+
;           | Disk is up  |
;           +-------------+
TICK0:      CMP     [DSKREQ],0              ; Any pending requests?
            JE      TICK0I                  ;   no, don't reset timer
            MOV     [DSKREQ],0              ; Reset request flag
            MOV     [TIMER],0               ; Reset timer
TICK0I:     INC     [TIMER]                 ; Increment timer
            MOV     AX,[TIMER]              ; Get it
            CMP     AX,[TIMOUT]             ; Timeout yet?
            JAE     TICK0T                  ;   yes, go handle it
            ADD     AX,PARKTM               ; Add park preparation time
            CMP     AX,[TIMOUT]             ; Time to park heads?
            JNE     TICK0X                  ;   no, don't park
            CALL    PARK                    ;   yes, park heads
TICK0X:     RET                             ; Return
TICK0T:     MOV     [TIMER],0               ; Clear timer
            MOV     [STATE],UPTODN          ; Change state
            JMP     TICK1                   ; Go generate first tone
;
;           +---------------------+
;           | Disk is coming down |
;           +---------------------+
TICK1:      MOV     AX,[TIMER]              ; Get timer
            INC     [TIMER]                 ; Bump timer for next time
            CMP     AX,[NTONES]             ; At end of tone table?
            JAE     TICK12                  ;   yes, go change state
            LEA     BX,DNFREQ               ; Point to tone table
            ADD     BX,AX                   ; Add once
            ADD     BX,AX                   ; Add twice to get correct offset
            MOV     CX,[BX]                 ; Get tone from table
            CALL    SOUND                   ; Generate it
            RET                             ; Return
TICK12:     CALL    SOUND0                  ; Turn off speaker
            MOV     [TIMER],0               ; Reset timer
            MOV     [STATE],DISKDN          ; Disk is now down
            RET                             ; Return
;
;           +---------------+
;           | Disk is down  |
;           +---------------+
TICK2:      CMP     [DSKREQ],0              ; Any requests
            JE      TICK2X                  ;   no, go return
            CALL    UPMSG                   ; Display message
```

```
            MOV     [TIMER],0              ; Clear timer
            MOV     [STATE],DNTOUP         ; Change state
            JMP     TICK3                  ; Go generate first tone
TICK2X:     RET                            ; Return
;
;           ┌─────────────────────┐
;           │ Disk is coming up   │
;           └─────────────────────┘
TICK3:      MOV     AX,[TIMER]             ; Get timer
            INC     [TIMER]                ; Bump timer for next time
            MOV     CX,0                   ; Set default sound to off
            CMP     AX,[NTONES]            ; At end of tone table?
            JAE     TICK34                 ;   yes, go change state
            LEA     BX,UPFREQ              ; Point to tone table
            ADD     BX,AX                  ; Add once
            ADD     BX,AX                  ; Add twice to get correct offset
            MOV     CX,[BX]                ; Get tone from table
TICK3S:     CALL    SOUND                  ; Generate it
            RET                            ; Return
;
;           ┌──────────────────────────────────────────────────────────┐
;           │ Reset state to DISKUP even though it may not be ready yet│
;           └──────────────────────────────────────────────────────────┘
TICK34:     CALL    SOUND0                 ; Stop tones
            MOV     [TIMER],0              ; Reset timer
            MOV     [STATE],TESTIT         ; Let caller try to reset the drive
            RET                            ; Return
;
;           ┌─────────────────────────────────────────────────┐
;           │ Waiting for interrupt caller to reset the drive │
;           └─────────────────────────────────────────────────┘
TICK4:      INC     [TIMER]                ; Keep timer running
            RET                            ; Do nothing
;           ┌─────────────────────────┐
;           │ Drive has been reset    │
;           └─────────────────────────┘
TICK5:      CALL    UNDOMS                 ; Remove message
            MOV     [TIMER],0              ; Clear timer
            MOV     [STATE],DISKUP         ; Change state
            RET                            ; Return
;
;           ┌─────────────────┐
;           │ Invalid state 6 │
;           └─────────────────┘
TICK6:      RET                            ; Do nothing ;
;           ┌─────────────────┐
;           │ Invalid state 7 │
;           └─────────────────┘
TICK7:      RET                            ; Do nothing ;
;           ┌─────────────────────────────┐
;           │ Interrupt 13 is routed here │
;           └─────────────────────────────┘
INT13:      PUSHF                          ; Save flags
            INC     CS:[DSKREQ]            ; Set request (will reset timer)
            CMP     CS:[STATE],DISKUP      ; Disk up?
            JE      INT13F                 ;   yes, continue
            STI                            ; Enable interrupts
HOLD13:     CMP     CS:[STATE],TESTIT      ; Disk ready for testing?
            JNE     HOLD13                 ;   no, keep on waiting
TEST13:     CMP     CS:[TIMER],18          ; One second elapsed?
            JB      TEST13                 ;   no, keep waiting
            MOV     CS:[TIMER],0           ; Clear timer
            CALL    CHKDSK                 ; See if hard disk is ready
            JC      TEST13                 ; Keep trying until no error
            CALL    RESET                  ; Reset hard disk
            MOV     CS:[STATE],READY       ; Let timer interrupt reset STATE
WAITOK:     CMP     CS:[STATE],DISKUP      ; Is it ready?
            JNE     WAITOK                 ;   no, keep waiting
INT13F:     POPF                           ; Restore flags
INT13J:     DB      0EAh                   ; Long jump instruction
INT13O      DW      0                      ; Previous offset
INT13S      DW      0                      ; Previous segment
```

```
;
;       ┌─────────────────────────────────┐
;       │ Interrupt 1C is routed here     │
;       └─────────────────────────────────┘
INT1C:  PUSHF                               ; Save flags
        CALL    TICK                        ; Go figure out what to do
        POPF                                ; Restore flags
        DB      0EAh                        ; Long jump instruction
INT1CO  DW      0                           ; Previous offset
INT1CS  DW      0                           ; Previous segment ;
;       ┌─────────────────────────────────┐
;       │ Interrupt 2F is routed here     │
;       └─────────────────────────────────┘
INT2F:  PUSHF                               ; Save flags
        CMP     AH,CS:[PID]                 ; This program?
        JNE     INT2FJ                      ;  no, continue in the chain
        CMP     CS:[PID],0                  ; Do we have an ID yet?
        JE      INT2FJ                      ;  no, continue in the chain
        MOV     AL,0FFh                     ; Return program ID found
        PUSH    CS                          ; Get code segment
        POP     ES                          ; Move to ES
        MOV     DI,0                        ; Point to ES:0
        POPF                                ; Restore flags
        IRET                                ; Return program signature
INT2FJ: POPF                                ; Restore flags
        DB      0EAh                        ; Long jump instruction
INT2FO  DW      0                           ; Previous offset
INT2FS  DW      0                           ; Previous segment RESIDE  DB      0                           ; End of resident portion NOTOS2  DB      'This program only works on DOS-based systems.',CR,LF
        DB      'Please refer to your manual for information on using'
        DB      ' DiskSaver under OS/2.',CR,LF,'$'
DUPINS  DB      'DiskSaver software has already been installed.',CR,LF,LF,'$'
INSOK   DB      LF,'DiskSaver software is now installed.',CR,LF,'$'
UNINS   DB      'DiskSaver software has been removed from memory.',CR,LF,'$'
TPRE    DB      'DiskSaver will power down the hard disk after ','$'
TPOST   DB      ' minutes of inactivity.',CR,LF,'$'
TDISAB  DB      'DiskSaver has been disabled (no power down).',CR,LF,'$'
QMODE   DB      'No a','$'
AMODE   DB      'A','$'
BMODE   DB      'udible tones will be generated at hard disk power up'
        DB      ' and down.',CR,LF,'$'
BADNUM  DB      'The maximum timeout value is 60 minutes.',CR,LF,'$'
BADCMD  DB      'Invalid option',CR,LF,LF
MSGHLP  DB      'Options are:',CR,LF
        DB      '  /T<n>    Turn off hard disk after <n> minutes',CR,LF
        DB      '  /T0      Temporarily disable DiskSaver',CR,LF
        DB      '  /A       Generate audible tones at hard disk power up'
        DB      '  and down',CR,LF
        DB      '  /Q       Quiet mode (no audible tones)',CR,LF
        DB      '  /U       Uninstall DiskSaver software from memory',CR,LF
        DB      '  /?       Display this help information',CR,LF
        DB      '$'

;
;       ┌─────────────────────────────────────────┐
;       │ Display number in AX (between 0 and 99) │
;       └─────────────────────────────────────────┘
DSPNUM: CMP     AX,10                       ; Leading digit needed?
        JB      DSPNU2                      ;  no, continue
        MOV     CL,10                       ; Divide by 10
        DIV     CL                          ; Do it
        MOV     BL,AH                       ; Save lower digit
        ADD     AL,'0'                      ; Make leading digit ASCII
        MOV     DL,AL                       ; Move to DL
        MOV     AH,02h                      ; Display character
        INT     21h                         ; Do it
        MOV     AL,BL                       ; Recover second digit
DSPNU2: ADD     AL,'0'                      ; Make digit ASCII
        MOV     DL,AL                       ; Move to DL
        MOV     AH,02h                      ; Display character
        INT     21h                         ; Do it
        RET                                 ; Return
```

```
;
;       ┌─────────────────────────────────┐
;       │ Get a number and return it in AX │
;       └─────────────────────────────────┘
;
GETNUM: MOV     AX,0                    ; Start with 0
        MOV     BH,0                    ; Clear high byte of BX
GETDIG: MOV     BL,[SI]                 ; Get next digit
        CMP     BL,'0'                  ; Less than '0'?
        JB      GETRET                  ;  yes, done
        CMP     BL,'9'                  ; Greater than '9'?
        JA      GETRET                  ;  yes, done
        INC     SI                      ; Advance pointer
        SUB     BL,'0'                  ; Remove ASCII part of digit
        MOV     CX,10                   ; Multiply by 10
        MUL     CX                      ; Do it
        ADD     AX,BX                   ; Add digit
        JMP     GETDIG                  ; Continue for all digits
GETRET: RET                             ; Return ;
;       ┌─────────────────────────────────┐
;       │ Actual installation begins here │
;       └─────────────────────────────────┘
;
INSTAL: LEA     DX,WELCOM               ; Get welcome message
        MOV     AH,09h                  ; Display string
        INT     21h                     ; Do it ;
;       ┌──────────────────────────────────────┐
;       │ Make sure we're not running under OS/2 │
;       └──────────────────────────────────────┘
;
        MOV     AH,30h                  ; Get DOS version
        INT     21h                     ; Do it
        CMP     AL,10                   ; DOS version (<10)?
        JB      READV                   ; If so continue
        LEA     DX,NOTOS2               ; Point to error message
        MOV     AH,09h                  ; Display string
        INT     21h                     ; Do it
        MOV     AX,4C00h                ; Exit program
        INT     21h                     ; Do it ;
;       ┌──────────────────┐
;       │ Read all vectors │
;       └──────────────────┘
;
READV:  MOV     AX,3513h                ; Get previous INT 13h
        INT     21h                     ; Do it
        MOV     INT13O,BX               ; Save offset
        MOV     INT13S,ES               ; Save segment
        MOV     AX,351Ch                ; Get previous INT 1Ch
        INT     21h                     ; Do it
        MOV     INT1CO,BX               ; Save offset
        MOV     INT1CS,ES               ; Save segment
        MOV     AX,352Fh                ; Get previous INT 2Fh
        INT     21h                     ; Do it
        MOV     INT2FO,BX               ; Save offset
        MOV     INT2FS,ES               ; Save segment ;
;       ┌────────────────────────────────────────────────────┐
;       │ Look for a previously installed version of DiskSaver │
;       └────────────────────────────────────────────────────┘
;
        MOV     [PID],MINPID            ; Set first program ID to look for
HUNT:   MOV     AH,[PID]                ; Get program ID
        MOV     AL,00h                  ; Look for a signature
        INT     2Fh                     ; Go look for it in the multiplex list
        CMP     AL,0FFh                 ; Did we find a signature?
        JE      CMPSIG                  ;  yes, see if signature matches
        CMP     AL,00h                  ; Is this number available?
        JNE     NOTIT                   ;  no, forget it
        CMP     [PIDAV],0               ; Did we find one yet?
        JNE     NOTIT                   ;  yes, don't worry about it
        MOV     AH,[PID]                ; Get program ID
        MOV     [PIDAV],AH              ; Remember it
        JMP     NOTIT                   ; Keep looking
```

```
;
;       ┌─────────────────────────────────────────────┐
;       │ See if signature matches this data segment  │
;       └─────────────────────────────────────────────┘
CMPSIG: LEA     SI,WELCOM               ; Point to welcome message
        MOV     DI,SI                   ; Point in both segments
        MOV     CX,ENDWEL-WELCOM        ; Check for length of welcome message
        CLD                             ; Just to be safe
        REP     CMPSB                   ; Compare two segments
        JZ      FOUND                   ; If same, get out ;
;       ┌────────────────────────┐
;       │ No match, keep trying  │
;       └────────────────────────┘
NOTIT:  INC     [PID]                   ; Try next one
        CMP     [PID],MAXPID            ; Too far?
        JBE     HUNT                    ;   no, keep trying
        MOV     AH,[PIDAV]              ; Get an available program ID
        MOV     [PID],AH                ; Remember it ;
;       ┌──────────────────────────┐
;       │ First time installation  │
;       └──────────────────────────┘
NEWINS: MOV     AX,CS                   ; Get this code segment
        MOV     ES,AX                   ; Copy to ES and use it
        JMP     CMDLIN                  ; Continue processing ;
;       ┌────────────────────────────────────────┐
;       │ Already installed - display a message  │
;       └────────────────────────────────────────┘
FOUND:  LEA     DX,DUPINS               ; Get already installed message
        MOV     AH,09h                  ; Display string
        INT     21h                     ; Do it ;
;       ┌──────────────────────────────┐
;       │ Start scanning command line  │
;       └──────────────────────────────┘
CMDLIN: MOV     SI,0081h                ; Point to command line ;
;       ┌────────────────────────────────────────┐
;       │ Parse next character on command line   │
;       └────────────────────────────────────────┘
PARSE:  MOV     AL,[SI]                 ; Get next character
        INC     SI                      ; Advance pointer
        CMP     AL,'a'                  ; Lower case?
        JB      NOCASE                  ;   no, don't worry about it
        SUB     AL,32                   ;   yes, convert to upper case
NOCASE: LEA     DX,MSGHLP               ; Point to help message
        CMP     AL,' '                  ; Space?
        JE      PARSE                   ;   yes, ignore it
        CMP     AL,'/'                  ; Slash?
        JE      PARSE                   ;   yes, ignore it
        CMP     AL,'-'                  ; Dash?
        JE      PARSE                   ;   yes, ignore it
        CMP     AL,'T'                  ; TIMOUT parameter?
        JE      PARMT                   ;   yes, go do it
        CMP     AL,'A'                  ; Audible mode parameter?
        JE      PARMA                   ;   yes, go do it
        CMP     AL,'Q'                  ; Quiet mode parameter?
        JE      PARMQ                   ;   yes, go do it
        CMP     AL,'U'                  ; Uninstall?
        JE      PARMU                   ;   yes, go do it
        CMP     AL,'?'                  ; Help?
        JE      ABORT                   ;   yes, display message and abort
        CMP     AL,CR                   ; End of line?
        JE      SHOW                    ;   yes, display settings
        LEA     DX,BADCMD               ; Point to message
ABORT:  MOV     AH,09h                  ; Display string
        INT     21h                     ; Do it
EXITP:  MOV     AX,4C00h                ; Exit program
        INT     21h                     ; Do it
```

```
;
;       ┌─────────────────────┐
;       │ Get timeout value   │
;       └─────────────────────┘
PARMT:  CALL    GETNUM              ; Get number
        CMP     AX,MAXVAL           ; Too high?
        JBE     DOMULT              ;  no, leave it alone
        LEA     DX,BADNUM           ; Point to message
        MOV     AH,09h              ; Display string
        INT     21h                 ; Do it
        MOV     AX,MAXVAL           ; Use maximum value
DOMULT: MOV     CX,1092             ; Prepare to multiply by 18.2 * 60
        MUL     CX                  ; Do it
        MOV     ES:[TIMOUT],AX      ; Save in TIMOUT
        JMP     PARSE               ; Continue parsing ;
;       ┌─────────────────────┐
;       │ Audible mode        │
;       └─────────────────────┘
PARMA:  MOV     ES:[NTONES],14      ; Include 9 ultrasonic + 5 audible
        JMP     PARSE               ; Continue processing ;
;       ┌─────────────────────┐
;       │ Quiet mode          │
;       └─────────────────────┘
PARMQ:  MOV     ES:[NTONES],9       ; Include 9 ultrasonic only
        JMP     PARSE               ; Continue processing ;
;       ┌─────────────────────┐
;       │ Uninstall           │
;       └─────────────────────┘
PARMU:  MOV     AX,CS               ; Get this code segment
        MOV     BX,ES               ; Get actual installation segment
        CMP     AX,BX               ; Same segment?
        JE      EXITP               ;  yes, there is nothing to uninstall
        JMP     UNINST              ;  no, go uninstall program ;
;       ┌─────────────────────────────┐
;       │ Display settings for TIMOUT │
;       └─────────────────────────────┘
SHOW:   LEA     DX,TDISAB           ; Assume disabled
        CMP     ES:[TIMOUT],0       ; Correct assumption?
        JE      SHOW2               ;  yes, just display message
        LEA     DX,TPRE             ; Get prefix message
        MOV     AH,09h              ; Display string
        INT     21h                 ; Do it
        MOV     AX,ES:[TIMOUT]      ; Get value
        MOV     DX,0                ; Clear high word
        MOV     CX,1092             ; Prepare to divide by 18.2 * 60
        DIV     CX                  ; Do it
        CALL    DSPNUM              ; Display value
        LEA     DX,TPOST            ; Get message
        MOV     AH,09h              ; Display string
        INT     21h                 ; Do it ;
;       ┌─────────────────────────────┐
;       │ Display settings for NTONES │
;       └─────────────────────────────┘
        LEA     DX,AMODE            ; Assume audible mode
        CMP     ES:[NTONES],14      ; Correct assumption?
        JE      SHOW1               ;  yes, just display message
        LEA     DX,QMODE            ; Switch to quiet mode
SHOW1:  MOV     AH,09h              ; Display string
        INT     21h                 ; Do it
        LEA     DX,BMODE            ; Get rest of message
SHOW2:  MOV     AH,09h              ; Display string
        INT     21h                 ; Do it ;
;       ┌─────────────────────────────────────┐
;       │ Bail out if we're already installed │
;       └─────────────────────────────────────┘
        MOV     AX,CS               ; Get this code segment
        MOV     BX,ES               ; Get ES
        CMP     AX,BX               ; ES unchanged?
        JE      TSR                 ;  yes, go trap INTs and tsr
```

```
              MOV     AX,4C00h              ; Exit program
              INT     21h                   ; Do it
;
;     ┌─────────────────────────┐
;     │ Trap interrupt vectors  │
;     └─────────────────────────┘
TSR:          LEA     DX,INT13              ; Point to new vector
              MOV     AX,2513h              ; Change INT 13h vector
              INT     21h                   ; Do it
              LEA     DX,INT1C              ; Point to new vector
              MOV     AX,251Ch              ; Change INT 1Ch vector
              INT     21h                   ; Do it
              LEA     DX,INT2F              ; Point to new vector
              MOV     AX,252Fh              ; Change INT 2Fh vector
              INT     21h                   ; Do it
;
;     ┌──────────────────────────────────────┐
;     │ Display installation successful message │
;     └──────────────────────────────────────┘
              LEA     DX,INSOK              ; Get already installed message
              MOV     AH,09h                ; Display string
              INT     21h                   ; Do it ;
;     ┌───────────────────────────┐
;     │ Terminate, but stay resident │
;     └───────────────────────────┘
              LEA     DX,RESIDE             ; Get length of resident program
              SHR     DX,1                  ; Divide by 2
              SHR     DX,1                  ; Divide by 4
              SHR     DX,1                  ; Divide by 8
              SHR     DX,1                  ; DX now contains number of paragraphs
              ADD     DX,16                 ; Add a fudge factor
              MOV     AX,3100h              ; Terminate and stay resident
              INT     21h                   ; Do it ;
;     ┌─────────────────────────┐
;     │ Undo interrupt vectors  │
;     └─────────────────────────┘
UNINST:       PUSH    DS                    ; Save DS
              MOV     DS,ES:[INT13S]        ; Get old INT 13h segment
              MOV     DX,ES:[INT13O]        ; Get old INT 13h offset
              MOV     AX,2513h              ; Change INT 13h vector
              INT     21h                   ; Do it
              MOV     DS,ES:[INT1CS]        ; Get old INT 1Ch segment
              MOV     DX,ES:[INT1CO]        ; Get old INT 1Ch offset
              MOV     AX,251Ch              ; Change INT 1Ch vector
              INT     21h                   ; Do it
              MOV     DS,ES:[INT2FS]        ; Get old INT 2Fh segment
              MOV     DX,ES:[INT2FO]        ; Get old INT 2Fh offset
              MOV     AX,252Fh              ; Change INT 2Fh vector
              INT     21h                   ; Do it
              POP     DS                    ; Restore DS
;
;     ┌───────────────┐
;     │ Free up memory │
;     └───────────────┘
              MOV     BX,ES:[002Ch]         ; Get environment memory
              PUSH    ES                    ; Save ES
              MOV     ES,BX                 ; Point to environment memory
              MOV     AH,49h                ; Free memory
              INT     21h                   ; Do it
              POP     ES                    ; Restore ES
              MOV     AH,49h                ; Free memory
              INT     21h                   ; Do it ;
;     ┌──────────────────────┐
;     │ Exit after uninstall │
;     └──────────────────────┘
              LEA     DX,UNINS              ; Point to message
              MOV     AH,09h                ; Display string
              INT     21h                   ; Do it
              MOV     AX,4C00h              ; Exit program
              INT     21h                   ; Do it

CODE          ENDS

END     START
```

While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. It is therefore contemplated that the appended claims cover any such modifications, and/or embodiments that fall within the true scope of the invention.

What is claimed is:

1. An ultrasonic control hard disk drive system having a plurality of memory devices including a nonvolatile hard disk drive memory and plurality of input and output devices comprising:
   a) a microprocessor;
   b) an electrical energy ultrasonic speaker connected to said microprocessor for generating an ultrasonic electrical energy signal; and
   c) a means response to said electrical energy ultrasonic signal for turning the power to said nonvolatile hard disk drive memory off, connected to said ultrasonic control hard disk drive system.

2. The ultrasonic control hard disk drive system of claim 1 wherein said ultrasonic signal is generated by a TSR (Terminate and Stay Resident) Program in said microprocessor.

3. The ultrasonic control hard disk drive system of claim 2 wherein said TSR program includes the following process steps:
   a) obtaining user settings for spin up and spin down time of said ultrasonic control hard disk drive system;
   b) linking disk and timer interrupts;
   c) establishing a timer variable and resetting said timer variable to 0;
   d) terminating and staying resident said TSR program in said microprocessor;
   e) detecting a hard disk drive interrupt from said hard disk drive;
   f) setting a hard disk drive request flag;
   g) waiting for a hard disk drive ready flag from said hard disk drive;
   h) determining if user had to wait;
   i) resetting said hard disk drive if user had to wait;
   j) detecting a timer interrupt in state 0 when said hard disk drive is up and running;
   k) determining if said a hard disk drive request flag is set;
   l) resetting timer to 0 if said disk request flag is set;
   m) incrementing a timer connected to said microprocessor;
   n) determining if said timer has reached said spin down time;
   o) changing to state 1 and resetting said timer to 0 if said timer has reached said spin down time;
   p) detecting timer interrupt in state 1 when said hard disk drive is coming down;
   q) turning off said hard disk drive ready flag;
   r) generating tones according to said timer;
   s) incrementing said timer;
   t) determining if by last tone has been sent;
   u) changing to state 2 and reset timer to zero (0) if by said last tone has been sent;
   v) returning to caller program;
   w) detecting timer interrupt in state 2 when the hard disk drive is already down;
   x) determining status of said hard disk drive request flag;
   y) changing to state 3 and resetting said timer to 0 if said hard disk drive request flag is set;
   z) performing a No-op If disk request flag is not set;
   aa) detecting a timer interrupt in state 3 when said hard disk drive is coming up;
   bb) generating tones according to said timer;
   cc) incrementing said timer;
   dd) determining if out of said tones; and
   ee) changing to state 0, resetting said timer and setting said hard disk drive ready flag.

4. The ultrasonic control hard disk drive system of claim 3 wherein said tones for turning said hard disk drive on and off via said ultrasonic speakers last for a PC clock cycle in the following sequence:
   a) LO MI HI LO MI HI LO MI HI to turn said hard disk drive on; and
   b) HI MI LO HI MI LO HI MI LO to said hard disk drive off wherein further;
      (i) LO equals low frequency ultrasonic electrical energy tone,
      (ii) MO equals medium frequency ultrasonic tone, and
      (iii) HI equals high frequency tone.

5. The ultrasonic control hard disk drive system of claim 3 wherein:
   a) said low frequency ultrasonic tone is 25 kHz;
   b) said medium frequency ultrasonic tone is 30 kHz; and
   c) said high frequency ultrasonic tone is 40 khz.

6. A hard disk-saver module having at least one microprocessor connected to a computer system having at least one input device, one output device and a hard disk drive as its peripherals comprising
   a) an electrical energy ultrasonic speaker connected to said disk-saver module for generating an ultrasonic electrical energy signal; and means responsive to said ultrasonic electrical energy signal for turning the power to said hard disk drive off which is connected to said hard disk saver module.

7. The hard disk-saver module of claim 6 wherein said ultrasonic coded signal is generated by a TSR (Terminate and Stay Resident) Program in said computer system.

8. The hard disk-saver module of claim 7 wherein said TSR program includes the following process steps:
   a) obtaining user settings for spin up and spin down time of said ultrasonic control hard disk drive;
   b) linking hard disk drive and timer interrupts from said disk drive to said microprocessor;
   c) establishing a timer variable and resetting said timer variable to 0;
   d) terminating and staying resident said TSR program in said microprocessor;
   e) detecting a disk interrupt from said hard disk drive;
   f) setting a hard disk drive request flag;
   g) waiting for the hard disk drive ready flag from said hard disk drive;
   h) determining if user had to wait;
   i) resetting said hard disk drive if user had to wait;
   j) detecting a timer interrupt in state 0 when said hard disk drive is up and running;
   k) determining if said hard disk drive request flag is set;
   l) resetting timer to 0 if said disk request flag is set;
   m) incrementing a timer connected to said microprocessor;

n) determining if said timer has reached said spin down time;
o) changing to state 1 and resetting said timer to 0 if said timer has reached said spin down time;
p) detecting timer interrupt in state 1 when said hard disk drive is coming down;
q) turning off hard disk drive ready flag;
r) generating tones according to said timer;
s) incrementing said timer;
t) determining if out of tones;
u) changing to state 2 and resetting timer to zero (0) if out of said tones;
v) returning to caller program;
w) detecting timer interrupt in state 2 when the hard disk is already down;
x) determining status of said hard disk drive request flag;
y) changing to state 3 and resetting said timer to 0 if said hard disk drive request flag is set;
z) performing a No-op If disk request flag is not set;
aa) detecting a timer interrupt in state 3 when said hard disk drive is coming up;
bb) generating tones according to said timer;
cc) incrementing said timer;
dd) determining if out of said tones; and
ee) changing to state 0, resetting said timer and setting said hard disk drive ready flag.

9. The hard disk-saver module of claim 8 wherein said tones for turning said hard disk drive on and off via said electrical energy ultrasonic speakers last for a PC timer tick in the following sequence:
   a) LO MI HI LO MI HI LO MI HI to turn said hard disk drive on; and
   b) HI MI LO HI MI LO HI MI LO to said hard disk drive off wherein further;
      (i) LO equals low frequency ultrasonic tone,
      (ii) MO equals medium frequency ultrasonic tone, and
      (iii) HI equals high frequency tone.

10. The disk-saver module of claim 9 wherein:
    a) said low frequency ultrasonic tone is 25 kHz;
    b) said medium frequency ultrasonic tone is 30 kHz; and
    c) said high frequency ultrasonic tone is 40 khz.

11. A process in a computer system having a speaker at least one microprocessor, one input device, one out put device and an ultrasonic control hard disk drive as its peripherals comprising the steps of:
    a) obtaining user settings for spin up and spin down time of said ultrasonic control hard disk drive;
    b) linking disk and timer interrupts from said hard disk drive to said microprocessor;
    c) establishing a timer variable and resetting said timer variable to 0;
    d) terminating and staying resident said TSR program in said microprocessor;
    e) detecting a hard disk drive interrupt from said hard disk drive;
    f) setting a hard disk drive request flag;
    g) waiting for the hard disk drive ready flag from said hard disk drive;
    h) determining if user had to wait;
    i) resetting said hard disk drive if user had to wait;
    j) detecting a timer interrupt in state 0 when said hard disk drive is up and running;
    k) determining if said hard disk drive request flag is set;
    l) resetting timer to 0 if said hard disk drive request flag is set;
    m) incrementing a timer connected to said microprocessor;
    n) determining if said timer has reached said spin down time;
    o) changing to state 1 and resetting said timer to 0 if said a timer has reached said spin down time;
    p) detecting timer interrupt in state 1 when said hard disk drive is coming down;
    q) turning off the hard disk drive ready flag;
    r) generating tones according to said timer;
    s) incrementing said timer;
    t) determining if out of tones;
    u) changing to state 2 and reset timer to zero (0) if out of said tones;
    v) returning to caller program;
    w) detecting timer interrupt in state 2 when the hard disk drive is already down;
    x) determining status of said hard disk drive request flag;
    y) changing to state 3 and resetting said timer to 0 if said hard disk drive request flag is set;
    z) performing a No-op If the hard disk drive request flag is not set;
    aa) detecting a timer interrupt in state 3 when said hard disk drive is coming up;
    bb) generating tones according to said timer;
    cc) incrementing said timer;
    dd) determining if out of said tones; and
    ee) changing to state 0, resetting said timer and setting said hard disk drive ready flag.

12. The process in a computer system of claim 11 wherein further said tones for turning said hard disk drive on and off via said ultrasonic electrical energy speakers last for a computer timer unit in the following sequence:
    a) LO MI HI LO MI HI LO MI HI to turn said hard disk drive on; and
    b) HI MI LO HI MI LO HI MI LO to said hard disk drive off wherein further.

13. A process in a computer system having at least one microprocessor, one input device, one out put device one speaker and an ultrasonic control hard disk drive as its peripherals each connected to said microprocessor as well as means for turning power to said hard disk drive off via a relay connected in series in the power supply to said hard disk drive comprising the steps of:
    a) determining polarity of said speaker;
    b) resetting state to none;
    c) measuring time of two complete cycles consisting of on off on off;
    d) converting time to a reading LO, MI, HI or indeterminate also known-as (??);
    e) waiting for 256 consecutive readings if said reading is Lo, or Mi-HI and doing nothing if indeterminate;
    f) determining new state by using a state table;
    g) determining if power relay change is required; and
    h) changing said relay if power change is required.

14. The process in a computer system of claim 13 where in said state table comprises the following states:
    a) NONE=Low+None+High;
    b) LOW=Low+Low to Medium+High;
    c) Transition LOW to MEDIUM=Low+Low to Medium+ON;
    d) HIGH=Low+High to Medium+High; and
    e) Transition HIGH to MEDIUM=OFF+High to Medium +High.

15. The process in a computer system of claim 14 wherein said hard disk drive is turned on by ascending frequency (low to medium to high) and turned off by descending frequency (high to medium to low).

16. The process in a computer system of claim 14 wherein further:
 (i) low comprises low frequency ultrasonic tone;
 (ii) medium comprises medium frequency ultrasonic tone; and
 (iii) high comprises high frequency tone.

17. The process in a computer system of claim 16 wherein:
 a) said low frequency ultrasonic tone is 25 kHz;
 b) said medium frequency ultrasonic tone is 30 kHz; and
 c) said high frequency ultrasonic tone is 40 khz.

18. The process in a computer system of claim 16 wherein further said tones for turning said hard disk drive on and off via said electrical energy ultrasonic speakers last for a computer timer unit in the following sequence:
 a) LO MI HI LO MI HI LO MI HI to turn said hard disk drive on; and
 b) HI MI LO HI MI LO HI MI LO to said hard disk drive off wherein further;

* * * * *